United States Patent
Becker

(10) Patent No.: US 7,029,222 B2
(45) Date of Patent: Apr. 18, 2006

(54) ARRANGEMENT FOR THE CONNECTION OF A FASTENING ELEMENT IN A PREASSEMBLED PART

(75) Inventor: Richard Becker, Grossostheim (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 10/443,729

(22) Filed: May 21, 2003

(65) Prior Publication Data

US 2004/0055121 A1  Mar. 25, 2004

(30) Foreign Application Priority Data

May 21, 2002 (DE) ................. 102 23 114

(51) Int. Cl.
*F16B 21/18* (2006.01)
(52) U.S. Cl. .................. 411/517; 411/512; 200/61.54; 200/61.55
(58) Field of Classification Search .............. 24/459, 24/484, 489, 530; 411/353, 509, 527, 907, 411/378, 392, 411, 511–517; 74/484 R, 74/482; 200/61.54, 245, 61.55, 257, 61.56; 280/728.2, 731, 728.3
See application file for complete search history.

(56) References Cited

U.S. PATENT DOCUMENTS

| | | | |
|---|---|---|---|
| 2,668,316 A | 2/1954 | Sturtevant el al. | |
| 4,114,509 A | 9/1978 | Poe | |
| 5,462,395 A | 10/1995 | Damm et al. | |
| 5,801,349 A * | 9/1998 | Komiya et al. | ........... 74/484 H |
| 5,807,052 A * | 9/1998 | Van Boven et al. | ........ 411/353 |
| 6,354,574 B1 | 3/2002 | Oliver et al. | |

FOREIGN PATENT DOCUMENTS

| | | |
|---|---|---|
| DE | 1 847 635 | 3/1962 |
| DE | 41 11 374 A1 | 10/1991 |
| EP | 0618 385 A1 | 10/1994 |
| EP | 0 744 329 A1 | 11/1996 |
| EP | 0 892 183 A1 | 1/1999 |
| EP | 1366956 A1 * | 12/2003 |

OTHER PUBLICATIONS

European Search Report No. 03090147.4-2423 dated Aug. 19, 2003.

* cited by examiner

*Primary Examiner*—Michael A. Friedhofer
(74) *Attorney, Agent, or Firm*—Fitch, Even, Tabin & Flannery

(57) ABSTRACT

A fastening arrangement for the connection of a fastening element in a preassembled part is provided. The fastening arrangement makes provision for the fastening element to be fastened in the preassembled part by a latch connection.

11 Claims, 4 Drawing Sheets

PRIOR ART

ARRANGEMENT FOR THE CONNECTION OF A FASTENING ELEMENT IN A PREASSEMBLED PART

FIELD OF THE INVENTION

The invention relates to an arrangement for the connection of a fastening element in a preassembled part.

BACKGROUND OF THE INVENTION

In the construction of machines and vehicles, but also in other technical fields, it is desirable to preassemble subassemblies and to put them together to form a finished product. It is therefore customary already to provide components at the preassembly stage with fastening elements, such as screws or bolts, with which the components are fastened to other subassemblies at the completion stage. The fastening elements have to be attached to the components in the position required for the subsequent final assembly and secured in such a manner that they do not change this position even during transportation.

It is thus known in practice in the construction of vehicles to preassemble contact bridges for steering wheels. Contact bridges are necessary for actuating the horn. The complete contact bridge comprises a contact plate and a further sheet-metal part which is arranged at a distance from the said plate and is referred to as a contact bridge. The two parts are provided at at least one point with contacts. Compression springs are arranged between the two parts and ensure that they keep a minimum distance apart, so that contacts lying opposite one another do not come into contact. The contacts are made by pressing down the contact bridge in the direction of the contact plate.

The contact bridge and the contact plate are connected to each other via screws. The screws are introduced from the upper side of the contact bridge through corresponding apertures and, with the compression springs being positioned in between, are inserted through the contact plate, so that the thread is exposed. The fastening takes place by means of a toothed disc in each case. A tool is used to press the toothed disc into a recess in the screw. A connection between the screw and the contact plate is therefore produced and the distance between the latter and the contact bridge is ensured. A complete subassembly is therefore provided. The screws for fastening the complete subassembly to the steering wheel are securely fastened at one end and at the other end are guided rotatably in the bushings.

The disadvantage of this arrangement is that the toothed disc for fastening the screw to the contact plate is required as an additional component and that the apertures for the screws have to be encapsulated with plastic in a separate injection mould, so that a plastic bushing for guiding the screws is produced.

SUMMARY OF THE INVENTION

The invention is based on the object of simplifying the connection of a fastening element to a preassembled part. The priority German patent application No. 102 23 114.1-24, filed on May 21, 2002, is incorporated by reference herein.

The invention achieves this in accordance with the features described herein.

In an arrangement for the connection of at least one fastening element in a preassembled part, according to the invention the fastening element is fastened in the preassembled part by means of a latching connection. For a latching connection it is not necessary to encapsulate the apertures for the screws with plastic. An additional toothed disc is likewise rendered superfluous.

It is expedient for an elastically deformable bushing to be provided in an aperture of the preassembled part and to have a latching section which is assigned a latching section in the fastening element.

The fastening element is fastened rotatably in the preassembled part, and a screw or a bolt is preferably provided as the fastening element.

In a first embodiment, the bushing has, in the latching section, a latching lug which is assigned a groove in the fastening element.

When a screw is used as the fastening element the groove is provided in a thread-free section of the screw.

In a second embodiment, the fastening element has a latching lug which is assigned a groove in the bushing. In this embodiment, when a screw is used as the fastening element the latching lug is provided in a thread-free section of the screw.

In both embodiments, an encircling groove and an encircling latching lug are preferably provided.

In one special embodiment, at least one screw is provided as the fastening element for the connection of a contact bridge to a contact plate arranged at a distance from said bridge, with there being a latching connection to the contact plate. In this embodiment, the elastically deformable bushing can be pushed into the contact plate from that side of it which faces away from the contact bridge. The bushing bears against this side of the contact plate with a flange. The bushing protrudes out of the contact plate in the direction of the contact bridge, and the protruding section is surrounded by a compression spring arranged between the contact plate and the contact bridge.

BRIEF DESCRIPTION OF THE DRAWINGS

The invention will be explained in greater detail with reference to drawings, in which.

DETAILED DESCRIPTION OF THE PREFERRED EMBODIMENTS

Figure 1:
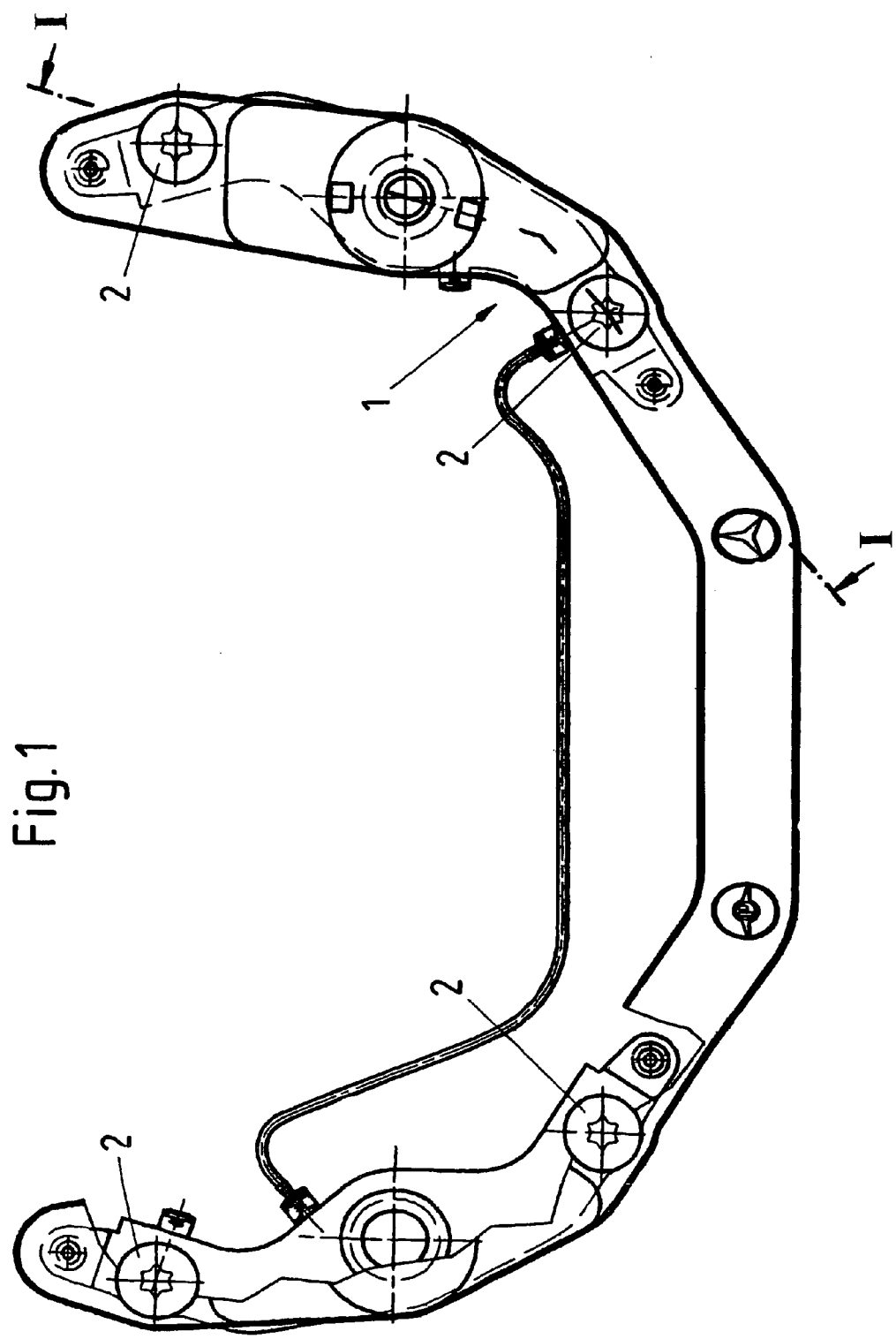
FIG. 1 shows a contact bridge in plan view.
Figure 2:
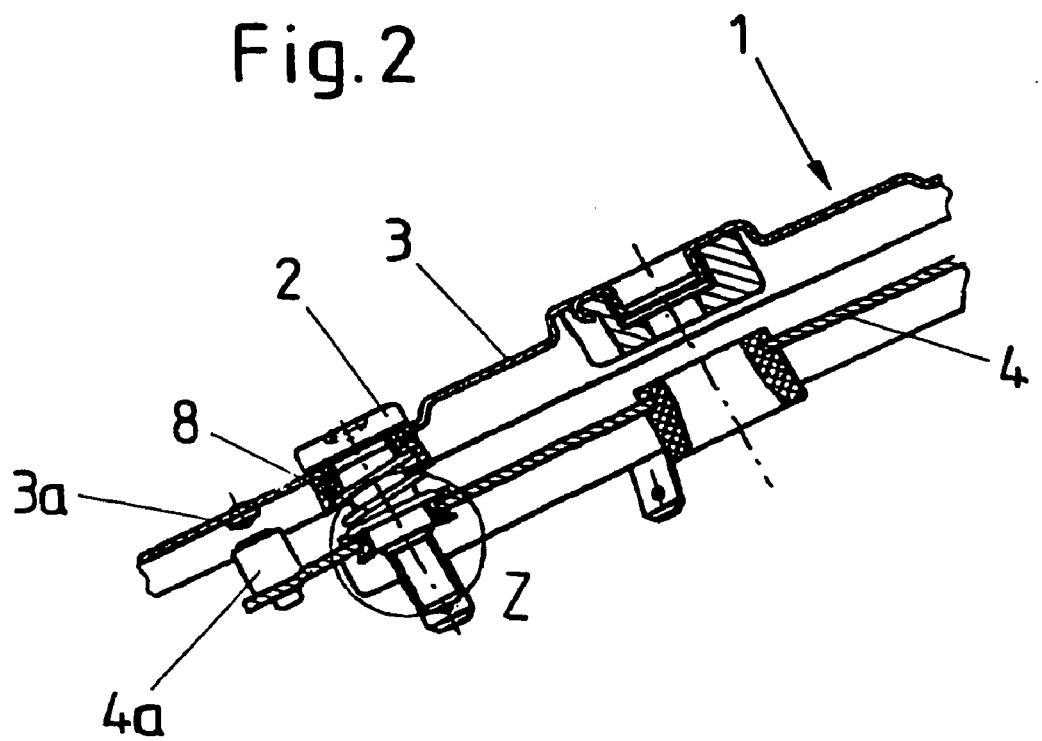
FIG. 2 shows a section through a complete contact bridge taken through the line I—I of FIG. 1 in a prior art embodiment.

FIG. 1 illustrates a complete contact bridge 1 whose parts are connected by screws 2. It is apparent from FIG. 2 that the complete contact bridge 1 essentially has a contact bridge 3 which lies at a distance opposite a contact plate 4. The contact bridge 3 has at least one contact 3a which is assigned a mating contact 4a on the contact plate 4. Each screw 2 bears with its head against the contact bridge 3 and is guided rotatably in the contact plate 4 in a bushing 5. The latter is connected to a toothed disc 6. Each screw 2 has a recess 7 in which the toothed disc 6 can engage.

Figure 3:
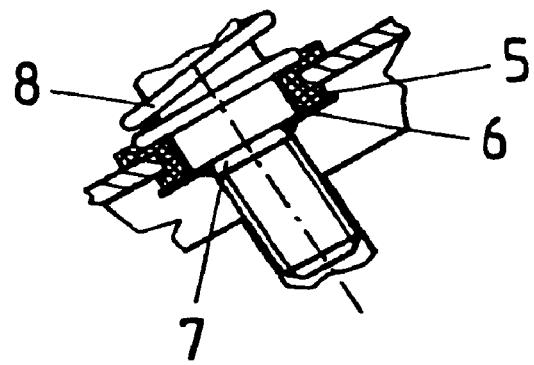
FIG. 3 shows the detail Z from FIG. 2.

After the screws 2 have been introduced together with a respective compression spring 8 into the contact bridge 3 and into the contact plate 4, the toothed disc 6 is pressed into the recess 7 by means of a tool, as is illustrated in FIG. 3, so that it is connected fixedly to the contact plate 4. After all of the screws 2 have been fastened in the described manner, the complete contact bridge 1 is available as a preassembled subassembly for fitting into a steering wheel.

FIGS. 4 to 7 illustrate an embodiment of the arrangement according to the invention. Screws 9 are provided for the connection of the contact bridge 3 to the contact plate 4, the said screws 9 having a groove 11 which runs annularly in a thread-free section 10 of the stem. This screw section is assigned a bushing 12 in the contact plate 4, the bushing having a flange 13 and a latching lug 14 which likewise runs annularly. However, neither the groove nor the latching lug have to be of annular design; rather, they may also be provided in the form of segments.

Figure 5:
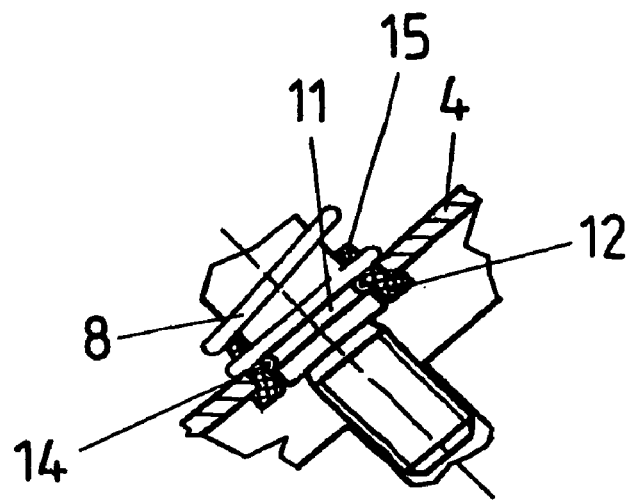
FIG. 5 shows the detail Z from FIG. 4.
Figure 4:
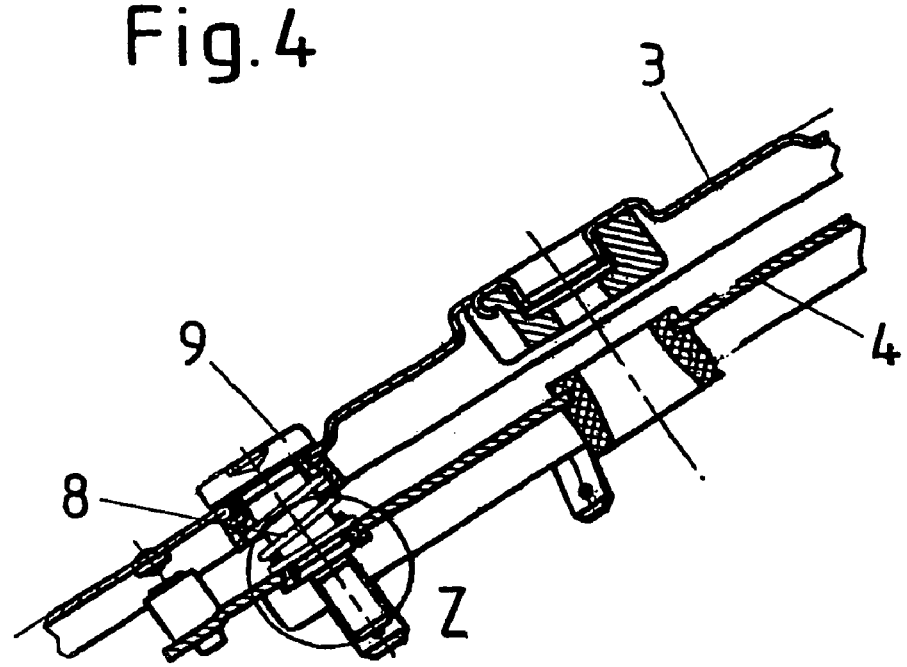
FIG. 4 shows a section through a complete contact bridge taken through the line I—I of FIG. 1 according to the invention.
Figure 6:
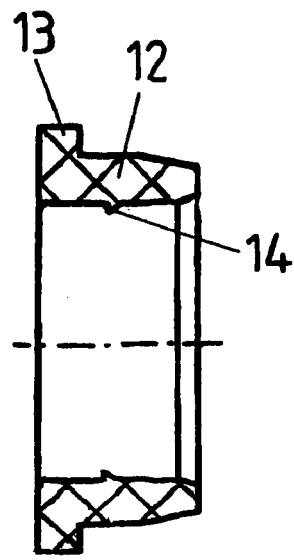
FIG. 6 shows a bushing according to the invention.
Figure 7:
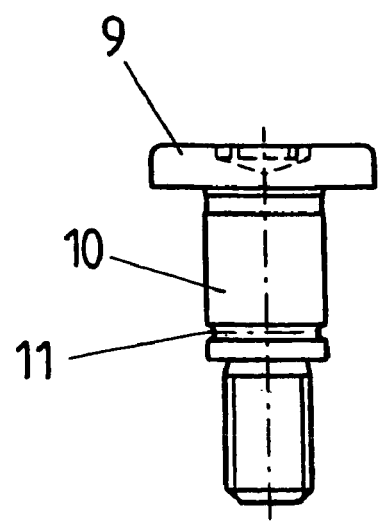
FIG. 7 shows a screw according to the invention.

During assembly, the screws 9 are introduced into the contact bridge 3 and, with the compression springs 8 positioned in between, the contact plate 4 is pressed together with the bushings 12 in the direction of the contact bridge 3 until the latching lugs 14 of the bushings 12 have latched into the grooves 11 of the screws 9, as illustrated in FIGS. 4 and 5. In this latched-in position, the bushing 12 protrudes over the contact plate 4 in the direction of the contact bridge 3. The compression spring 8 engages around the protruding section 15 of the bushing 12.

A toothed disc is not required for this connection according to the invention, i.e. an additional component is rendered superfluous. Furthermore, a separate plastic injection mould is not required.

After the bushings 12 have latched into the screws 9, the complete contact bridge 1 is available as a preassembled subassembly which can now be fastened to the steering wheel by means of the screws 9.

In addition to this embodiment an embodiment is also possible in which the screws have a latching lug and the bushings have an associated groove. This embodiment has not been illustrated separately.

What is claimed is:

1. A fastening arrangement comprising:
    a preassembled part including an aperture and an elastically deformable bushing in the aperture;
    a fastening element;
    a latching connection for securing the fastening element to the preassembled part, the latching connection comprising cooperating latching sections of the fastening element and the bushing.

2. The fastening arrangement of claim 1 wherein the latching connection is configured to allow the fastening element to be rotatably secured to the preassembled part.

3. The fastening arrangement of claim 1 wherein the fastening element comprises one of a screw and a bolt.

4. The fastening arrangement of claim 1 wherein the bushing latching section comprises one of a latching lug and a groove and the fastening element latching section comprises the other of the latching lug and the groove.

5. The fastening arrangement of claim 4 wherein the fastening element includes threaded and thread-free sections, and the fastening element latching section is in the thread-free section of the fastening element.

6. The fastening arrangement of claim 4 wherein the groove has an annular configuration.

7. The fastening arrangement of claim 4 wherein the lug has an annular configuration.

8. The fastening arrangement of claim 4 wherein the latching lug and groove each have an annular configuration.

9. The fastening arrangement of claim 1 wherein the preassembled part comprises a contact bridge and a contact plate spaced from the bridge and connected to the bridge via the fastening element with the latching connection being between the fastening element and the contact plate.

10. The fastening arrangement of claim 9 wherein the contact plate includes the aperture, and the elastically deformable bushing has a portion sized to fit in the aperture and an enlarged flange portion for engaging the contact plate about the aperture with the bushing inserting in the aperture so that the contact plate is between the contact bridge and the bushing flange.

11. The fastening arrangement of claim 10 wherein the bushing includes a protruding section sized to extend out from the aperture opposite from the bushing flange engaged with the contact plate, and
    a spring mounted about the bushing protruding section and extending between the contact plate and the bridge plate.

* * * * *